Sept 8, 1925.

P. SCHON 1,553,051

RAILROAD MOTOR TRUCK

Filed April 26, 1923

INVENTOR
Pierre Schon
BY
ATTORNEYS

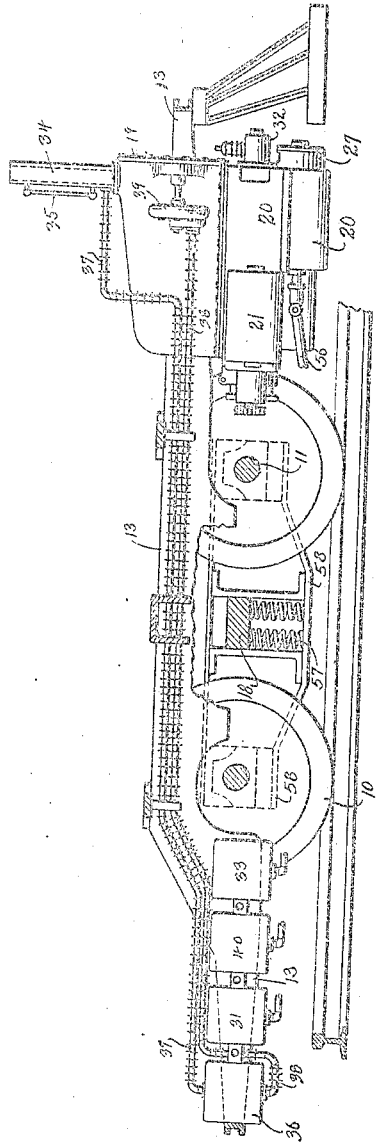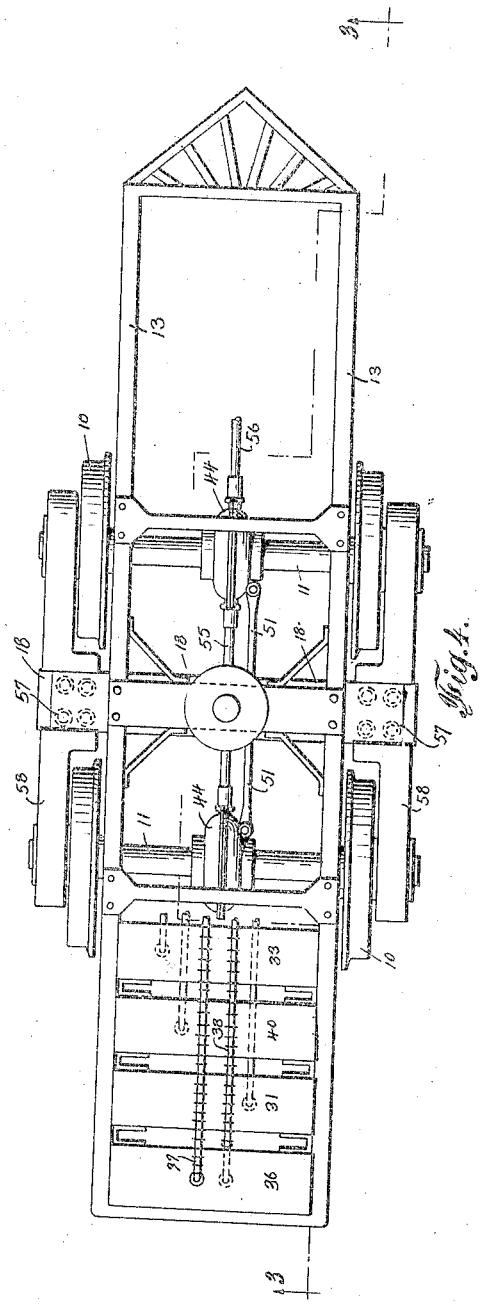

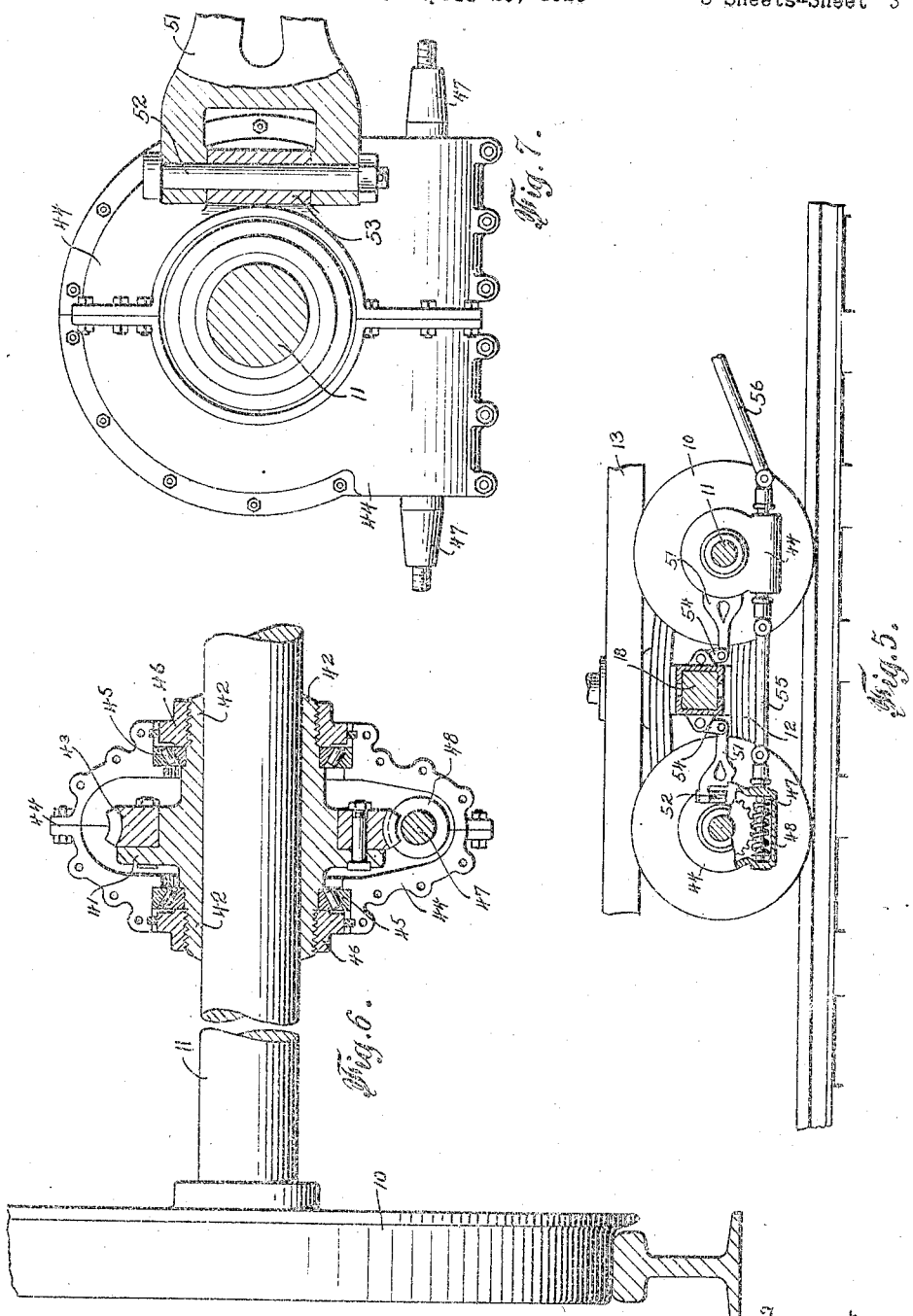

Patented Sept. 8, 1925.

1,553,051

UNITED STATES PATENT OFFICE.

PIERRE SCHON, OF PONTIAC, MICHIGAN.

RAILROAD MOTOR TRUCK.

Application filed April 26, 1923. Serial No. 634,809.

*To all whom it may concern:*

Be it known that I, PIERRE SCHON, a citizen of the United States of America, residing at Pontiac, in the county of Oakland and State of Michigan, have invented certain new and useful Improvements in Railroad Motor Trucks, of which the following is a specification.

This invention relates to railroad car and engine equipment, and more particularly to an internal combustion motor railroad truck.

The primary object of the invention is to produce a self-contained, self balanced power unit or railroad motor truck for use in connection with railway trains, cars, coaches, and the like, and particularly for use in connection with single coaches or cars, thereby enabling railroad companies to convert ordinary freight or passenger cars into a self propelled transportation unit for use in handling traffic on short haul lines where it is desirable to make more frequent trips with the consequent use of less equipment operated on a smaller and more economical scale. An additional object is to produce a railroad motor truck of the foregoing character propelled by an internal combustion engine thereby enabling a railroad company to dispense with the use of steam locomotives now ordinarily used for handling one or two coaches at a time on short lines.

In the practice of my invention, a railroad company may quickly and economically convert any ordinary coach, freight car, Pullman, or private car, into a fully equipped self-contained power operated car, thereby dispensing with the use of a steam locomotive in handling one or two cars which makes for the economy in transporting small units or railroad equipment. In addition to the foregoing, my improved railroad motor truck may be used as a switching engine about railway yards and terminals, and is much more economical in this respect than the steam locomotive. Railroads may utilize my improved power truck for converting their old coaches and car equipment otherwise not useful, into single power driven cars for short lines and the like.

The design and construction of my railroad motor truck is of such character that a railroad car may be readily converted into a power driven car by lifting up one end of the car, removing the present four or six wheel truck and axle set, and thereupon rolling my motor truck under the car. The suspended car is now let down in position upon the saddle or bolster of the motor truck, the king pin is adjusted in position thereby pivotally connecting the coach and truck together, which completes the installation and thus providing a self propelled transportation unit ready for immediate service; and inasmuch as the rear end of the coach or car remains standard as to couplings, air connections, and the like, the converted coach may be utilized as a power car and coupled with other cars or coaches.

Referring now more particularly to the drawings for a detailed description of the invention, there is shown a railroad coach combined with my improved railroad motor truck as well as improved transmission means for converting an ordinary railroad wheel and axle set into a motor driven wheel and axle set. The construction, arrangement, and use of parts may be varied to suit particular needs, without departing from the scope and principle of my invention.

In the accompanying drawings, Figure 1 illustrates a side view of one end of an ordinary passenger coach or car with my improved truck adapted thereto; and the driver's vestibule of the motor truck is shown in section to better illustrate the installation of the power plant and controls upon the truck.

Figure 3 shows a side sectional view as developed on the line 3—3 of Figure 4, illustrating a slightly modified form or design of the motor truck.

Figure 4 illustrates a top view or plan of the motor truck shown in Figure 3, with the engine removed therefrom.

Figure 5 shows a fragmentary sectional view of the motor truck illustrated in Figure 1, the section being taken on the line 5—5 of Figure 2.

Figures 6 and 7 illustrate an improved transmission and gear case specially designed for use in connection with converting an ordinary railroad wheel and axle set into a motor driven unit; the first figure showing the worm wheel parts in section anchored to the car wheel axle with half of the gear case removed; and the latter figure illustrating a complete side view of the gear case shown in Figure 6.

Figure 1:
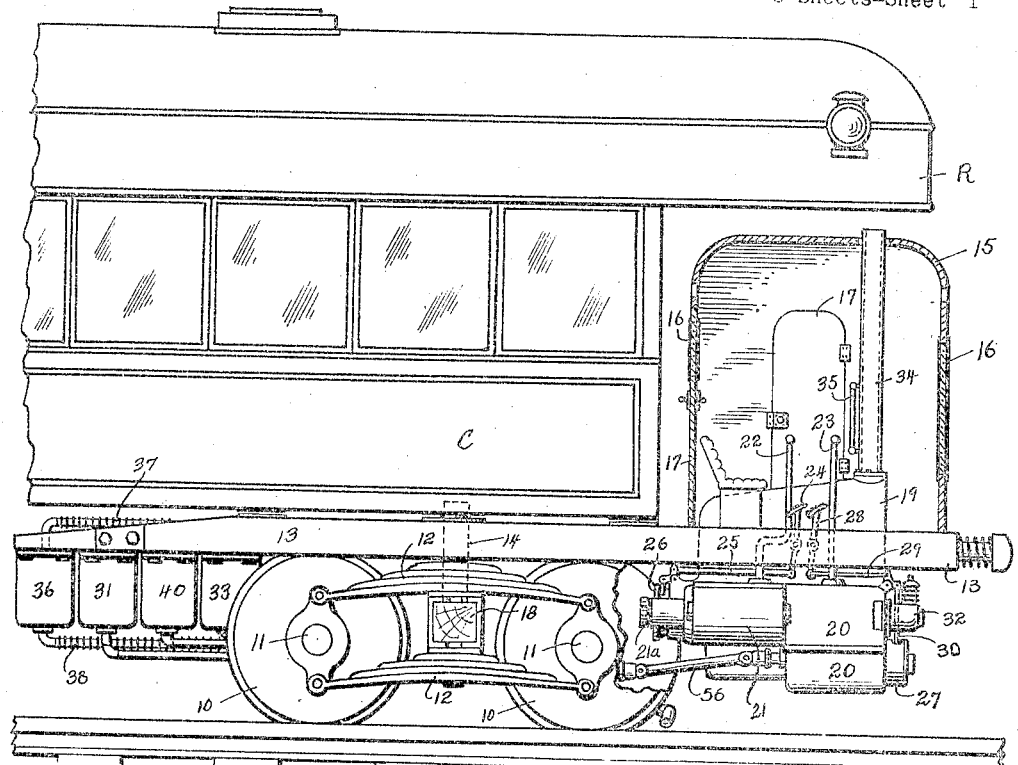
Figure 2:
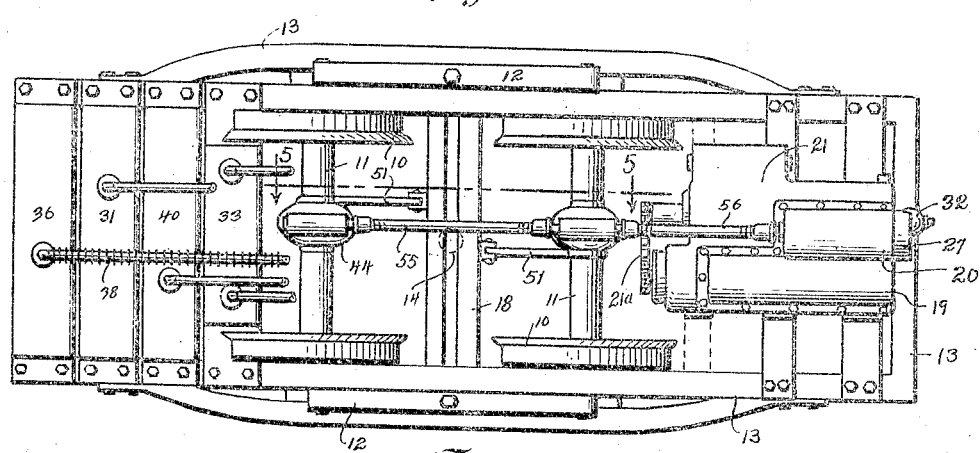
Figure 2 shows an underneath plan view of the motor truck.

Referring first to Figures 1 and 2 there is shown a railway car wheel and axle set comprising wheels 10 and axles 11 carrying dual semi-elliptic springs 12 anchored to a a truck bolster 18. A truck frame 13 is carried upon the springs and projects forwardly and rearwardly of the wheel and axle set, thereby affording a truck frame of substantial length upon which is installed the engine, material tanks, and various equipment required in this self propelled and contained railroad motor truck. A king pin 14 pivotally joins the truck with a railroad coach or car C, and relative swinging motion is allowed between the truck and coach in the same manner as in the use of an ordinary wheel and axle set, thereby enabling the motor driven truck to negotiate track curves by swinging around the king pin 14. A driver's vestibule 15 is installed on the forward end of the truck frame 13, and is provided with windows 16 affording clear vision to the car operator whether driving forwardly or backing up. The vestibule is made with doors 17; and the vestibule affords thorough protection to the driver in most inclement weather. The structure of this vestibule is of such design as enables it to fit under the overhanging platform roof R of the ordinary railroad coach C thus utilizing that space at the end of coach for the truck vestibule. Sufficient clearance exists between the vestibule and coach as will allow adequate lateral relative movement between the coach and truck in negotiating curves.

A heavy duty power plant comprising a water jacketed internal combustion motor 19 is installed at the forward end of the truck frame 13 in the driver's vestibule, and is provided with the usual type of clutch and transmission controls making for flexibility and efficiency in operating the motor truck. The engine is necessarily of the heavy duty type and is fitted with a suitable gear reduction transmission possessing a plurality of forward and reverse speeds. The transmission preferably comprises a primary transmission 21 driven as by a chain 21ᵃ from the engine 19 together with a secondary transmission 20. The transmissions 21 and 20 are internally gear or chain driven, and through the agency of this combination transmission, a wide range of power and speed is available to run the truck. The propeller and drive shafts and correlated driving gears on the axle and wheel set, as driven from the engine and transmission, will be hereinafter described. The transmission is fitted with gear shift levers 22 and 23 adapted to control the combination primary and secondary gear reduction transmission carried on the engine as a unitary part thereof. A clutch release pedal 24 connects through a rod 25 with the engine clutch 26 for controlling the engine clutch and gear shift transmission means. A brake and brake drum 27 is mounted on the transmission and contains suitable braking mechanism, and is operated through a pedal 28 with connecting links 29 and 30. This drum 27 is employed primarily for the purpose of holding in check the truck when it is operated as a separate unit disconnected from a coach, flat car etc.; and this brake is also useful in case of emergency, should the air brake fail to function. Throttle and other necessary controls are established in the driver's cab for operating and controlling the truck.

An air compressor 32 is installed upon and driven directly from the engine 19, and the compressor stores air in an air tank 33 placed on the rear of the truck frame. The compressed air tank 33 is employed for operating the usual railway air brake system on the coach and others which may be connected therewith. My invention also contemplates the use of an electric generator driven by the engine for charging storage batteries and the like for the car lighting system.

I employ an improved water cooling and radiating system for use in connection with the heavy duty power plant, and the truck design and arrangement of parts is laid out with the view of accommodating such engine cooling system. Additional reference is now made to Figure 3 where a stand pipe 34 made open at the top is secured to the uppermost part of the water jacketed engine 19, and a water glass gage 35 is placed on the water stand pipe to indicate the amount of water remaining in the stand pipe and cooling system. The stand pipe carries a supply of water which feeds directly into the engine water jacket, and inasmuch as the stand pipe is made open at the top, the excess heat or steam is vented from the cooling medium; and the cooling medium is conveniently replenished by filling the open end stand pipe. The stand pipe is preferably vented out through the cab to carry away vapor arising from the water employed in cooling the motor; and to this end, the stand pipe is made relatively small in diameter and rather tall in order that an adequate supply of water be available to feed the motor and the cooling system, as well as dispose the upper end of the stand pipe out through the driver's cab.

A water reserve supply tank 36 is mounted at the rear end of the truck frame, and a return pipe 37 connects the stand pipe and reserve tank for the purpose of leading the hot water from the engine and stand pipe back to the tank 36. A water pipe 38 connects the water tank 36 with the engine 19; and a circulating pump 39 is driven from the engine and connects with the pipe 38 for the purpose of circulating water through the engine, the stand pipe, and reserve water tank 36. The water circulating pipes 38 and 37 are preferably finned or made with radiating surface to aid in radiating and cooling the pipes as the hot water circulates therein, and similarly the standpipe and tank may be finned if desirable.

A gasoline fuel tank 31 and a sand tank 40 are carried on the rear of the frame, and aid in balancing the weight of the front end of the truck and engine over the wheels. Pipes are employed to convey fuel to the engine and sand to the tracks.

A description will now be given of the car wheel and axle set drive transmission which is operated from the engine, and additional reference is made to Figures 5, 6 and 7 in the drawings. The transmission elements which I have designed and brought together for this work readily enables the railroad company to convert the old truck wheel and axle into drivers functioning as locomotive drivers for use in connection with my railroad motor truck; and to this end I employ a flange 41 made integral with a hub 42 which is placed upon the car axle as by splitting the said flange and hub unless the car wheel 10 is removed for this assembling work. This flanged hub is welded, keyed, or otherwise permanently anchored to the axle 11; and a gear wheel 43, or preferably a worm wheel, is bolted to the flange 41. A gear case or housing 44 encloses the worm wheel 43, and roller bearings 45 are interposed between the rotating hub 42 and the stationary gear case 44. A nut 46 is set up against the bearing race which securely anchors the parts in operating position. A worm shaft 47 is journaled on ball or roller bearings in the gear case 44, and a worm 48 integral with the shaft meshes with the worm wheel 43. It is to be appreciated that the problem of building up and installing a suitable gear drive set on a railroad car axle is a more or less difficult one, and especially so since it may be desirable in some instances to install some of the parts without removing the car wheel from the axle. I construct the gear case 44 in section and employ two pairs of said sections, one pair for either side of the worm wheel. It is observed how, in Figures 6 and 7, the said gear case 44 consists of four parts where it is necessary to make the installation on the car axle without removing the wheel; and the housing sections are bolted together thus providing a heavy and substantial gear drive assembly.

It is understood how the gear case 44 remains stationary while the gear parts therein are driven from the engine; and accordingly a radius rod 51 is pivotally mounted on a pin 52 carried in a lug 53 cast integral with the gear case 44. The radius rod 51 is carried upon each car axle gear case 44 and runs to the center of the truck where it is pivoted to a shackle joint 54, which functions to hold the axle gear boxes or houses 44 in alignment, while at the same time relative motion between the car wheels and truck frame is permitted through the action of the truck springs. Thus each gear case 44 is held positively against rotation, thereby removing strain from the worm and shaft 47 as well as the connecting drive shaft and propeller shaft. A drive shaft 55 connects the worm shafts 47 of each axle; and a propeller shaft 56 connects one of the worm shafts with the engine transmission 20 thereby establishing a drive connection from the engine to the car drivers or wheels which are accordingly converted into traction wheels. Standard splined shaft joints and universal joints are employed to advantage in setting up the shaft drive assembly.

It is to be observed that the design and construction of the railroad motor truck as exhibited in Figure 1 employs a dual semi-elliptic spring suspension, while in Figure 3 I have illustrated a coil spring suspension consisting of coil springs 57 nested between the truck bolster 18 and car axle journaled box cradle 58. It is to be appreciated that either type of spring suspension may be effectively employed for use in connection with the structure constituting my invention; and the invention is presented to fill the want felt for railroad equipment of this improved type.

What I claim is:—

1. An improved combination railroad car motor truck comprising a substantially long frame, truck wheels carried under the center of the frame, frame pieces extending forwardly of the wheels, frame pieces extending rearwardly of the wheels, an engine installed on the front of the frame, material tanks carried on the rear of the frame and adapted to balance with the weight of the engine over the said truck wheels, and transmission means connecting the engine with the truck wheels.

2. An improved combination railroad motor truck comprising a car wheel and axle set, a frame extending beyond said wheel and axle set at each end thereof, a gear wheel fixed on an axle of the said wheel and axle set, an engine mounted upon one end of the truck frame and extending below the frame and in position aligned with the axles, a gear reduction transmission driven by the engine, a propeller shaft connecting the transmission with the gear wheel, material tanks installed on the other end of the frame and extending below said frame in alignment with the wheel and axle set thereby leaving a clear and unobstructed frame for the reception of a railroad coach.

3. A combination railroad motor truck unit comprising a car wheel and axle set, gears fixed to each axle, a drive shaft connecting the gears and adapted to drive same, a truck frame carried over the wheel and axle set and extending beyond the wheels at the front and rear, an engine installed on the front end of the frame beyond the wheels, a gear reduction transmission driven by the engine, a propeller shaft connecting the transmission with the drive shaft and gears, and material and fuel tanks installed on the other end of the frame beyond the wheels to balance with the engine weight over the wheel and axle set.

4. A railroad motor truck comprising a substantially long truck frame, a driver or engineer's vestibule carried on one end of the frame, an engine and controls installed on the frame within the vestibule, fuel and material tanks located on the other end of the frame, a car wheel and axle set centrally situated under the frame balancing the said tanks and vestibule end of the motor truck, and transmission means connecting the engine with the wheel and axle set.

5. A motor truck for railroad coaches and cars comprising a truck wheel and axle set, a truck frame mounted thereon and projecting to the front and rear of the truck wheels, fuel and material tanks located on the rear of the frame, an enclosed vestibule cab on the front end of the frame, an engine and controls installed in the cab, and transmission means connecting the engine with the wheel and axle set.

6. A combination railroad coach and motor truck comprising an ordinary railroad car possessing an overhanging car end platform roof, a motor truck frame, a king pin carried in the truck frame and fitting into the king pin bearing seat of the coach thereby adapting the truck to swing or pivot under the coach, a driver's cab mounted on the front of the truck frame and disposed under the overhanging coach end, an engine installed in the cab, material tanks installed on the rear of the truck frame, car wheels and axles supporting the frame, and transmission means running from the engine to the wheel and axle set.

7. A combination railroad motor truck comprising a wheel and axle set, a frame disposed over the truck and projecting forwardly and to the rear of the wheels, a power plant carried on one end of the frame, a cooling system including a water tank carried on the other end of the frame, water pipe connections running from the power plant to the tank to supply cooling medium to the power plant, suitable transmission means connecting the power plant to the wheel and axle set, and a water stand pipe connected with the pipe connections maintaining a high water level in the engine cooling system.

8. A combination railroad motor truck comprising a wheel and axle set, a frame disposed over the truck and projecting forwardly and to the rear of the wheels, a power plant carried on one end of the frame, a cooling system including a water tank carried on the other end of the frame, water pipe connections running from the power plant to the tank to supply cooling medium to the power plant, suitable transmission means connecting the power plant to the wheel and axle set, and a stand pipe carried upon the engine adapted to feed water to the engine cooling system.

9. A combination railroad motor truck comprising a wheel and axle set, a frame disposed over the truck, a power plant carried on the frame, a cooling system including a water tank carried on the frame, water pipe connections running from the power plant to the tank to supply cooling medium to the power plant suitable transmission means connecting the power plant to the wheel and axle set, and a water stand pipe connected with the pipe connections maintaining a high water level in the engine cooling system.

10. A combination railroad motor truck comprising a wheel and axle set, a frame disposed over the truck, a power plant carried on the frame, a cooling system including a water tank carried on the frame, water pipe connections running from the power plant to the tank to supply cooling medium to the power plant, suitable transmission means connecting the power plant to the wheel and axle set, and a standpipe carried upon the engine adapted to feed water to the engine cooling system.

11. A combination railroad motor truck comprising a wheel and axle set, a frame disposed over the truck and projecting forwardly and to the rear of the wheels, a power plant carried on one end of the frame, a cooling system including a water tank carried on the other end of the frame, water pipes connecting the power plant and tank, transmission means connecting the power plant to the wheel and axle set, and material tanks disposed adjacent the water tank combining in weight therewith and adapted to balance with the power plant.

12. A motor truck for railroad coaches and cars comprising a truck wheel and axle set, a truck frame mounted thereon projecting to the front and rear of the truck wheels, fuel and material tanks located on the rear of the frame, an enclosed vestibule cab on the front end of the frame, an engine and controls installed in the cab, transmission means connecting the engine with the wheel and axle set, and an engine cooling system comprising a water stand pipe mounted upon the engine to feed water thereto and having the upper end thereof vented through the vestibule.

13. A motor truck for railroad coaches and cars comprising a truck wheel and axle set, a truck frame mounted thereon, fuel and material tanks located on the frame, an enclosed vestibule cab on the frame, an engine and controls installed in the cab, an engine cooling system comprising a long standpipe mounted upon the engine to feed water thereto and vented outwardly through the vestibule, and transmission means connecting the engine with the wheel and axle set.

In testimony whereof I hereunto affix my signature.

PIERRE SCHON.